J. H. Luddington,
Pump.
No. 89,672. Patented May 4, 1869.
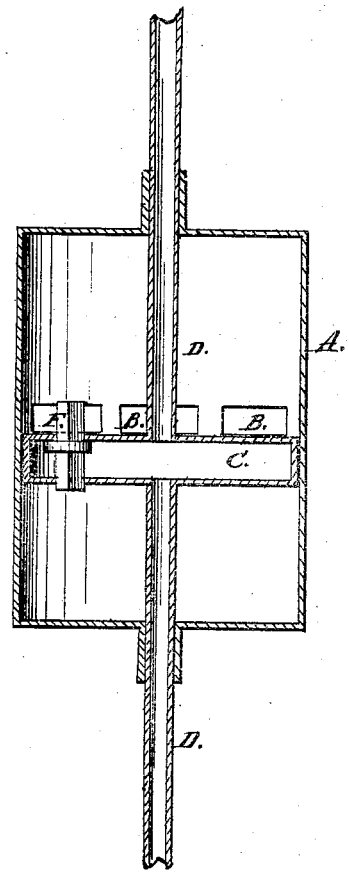
Witnesses:
Gustave Dietrich
John F. Brooks
Inventor:
J. H. Luddington
per Munn & Co.
Attorneys.

United States Patent Office.

JAMES H. LUDDINGTON, OF BRIDGEPORT, CONNECTICUT.

Letters Patent No. 89,672, dated May 4, 1869.

IMPROVEMENT IN PUMPS.

The Schedule referred to in these Letters Patent and making part of the same.

*To all whom it may concern:*

Be it known that I, JAMES H. LUDDINGTON, of Bridgeport, in the county of Fairfield, and State of Connecticut, have invented a new and useful Improvement in Submerged Force-Pumps; and I do hereby declare that the following is a full, clear, and exact description thereof, which will enable others skilled in the art to make and use the same, reference being had to the accompanying drawings, forming part of this specification.

This invention relates to new and useful improvements in force-pumps which are operated when submerged in the water, as in wells and cisterns; and consists in operating a hollow piston in a stationary cylinder, with water-apertures through the sides of the cylinder, and with the discharge-apertures at the ends of a tubular piston-rod, as hereinafter more fully described.

The accompanying plate of drawings represents a vertical central section of a force-pump, constructed according to my invention.

A is the cylinder, with one or more apertures, B, through which the water passes into the cylinder, when the pump is submerged.

C is the piston, which is hollow, and which, in operating the pump, is forced past the apertures B in each direction, or at each stroke, allowing water to enter the cylinder both above and below it.

D is the piston-rod, which is hollow, or tubular, and in communication with the interior of the piston.

E is a reciprocating valve, in the piston, which rises and falls according to the pressure.

As seen in the drawing, the piston is moving downward; consequently the valve closes the aperture in its upper side, and admits water through the lower aperture, which water is discharged through the ends of the piston-rod; but in practice, one end of the piston-rod would be closed, or one part of the rod may be made solid, when all the water would be discharged from the other end, at each stroke of the piston.

It will be seen that as the piston works up and down, or past the apertures B, water will enter the cylinder, and be discharged into the piston, past the valve E, and out through the valve-rod at each stroke.

The cylinder is confined beneath the surface of the water, and suitable stuffing-boxes are applied for packing the rod at its end.

By this arrangement no valves are used, except the one in the piston, and that cannot get out of order, whilst the piston and stuffing-boxes, being always under water, must always be lubricated, and consequently effective and durable.

Having thus described my invention,

I claim as new, and desire to secure by Letters Patent—

1. The apertures B, in the side of the cylinder A, for admitting water, substantially as shown and described.

2. In combination with the apertures B, one or more, the piston C, valve E, and tubular piston-rod D, when constructed, arranged, and operating substantially as and for the purposes herein shown and described.

The above specification of my invention signed by me, this 30th day of January, 1869.

J. H. LUDDINGTON.

Witnesses:
FRANK BLOCKLEY,
ALEX. F. ROBERTS.